US009885157B1

(12) United States Patent
Eliason et al.

(10) Patent No.: US 9,885,157 B1
(45) Date of Patent: Feb. 6, 2018

(54) PAVER ADHESIVE AND METHOD OF LAYING PAVERS

(71) Applicant: PAVER TECHNOLOGIES LLC, Vero Beach, FL (US)

(72) Inventors: William Eliason, Vero Beach, FL (US); Timothy Berry, Vero Beach, FL (US)

(73) Assignee: PAVER TECHNOLOGIES LLC, Vero Beach, FL (US)

( * ) Notice: Subject to any disclaimer, the term of this patent is extended or adjusted under 35 U.S.C. 154(b) by 0 days.

(21) Appl. No.: 15/697,726

(22) Filed: Sep. 7, 2017

Related U.S. Application Data

(63) Continuation of application No. 15/288,433, filed on Oct. 7, 2016, now Pat. No. 9,790,650.

(51) Int. Cl.
| | | |
|---|---|---|
| *E01C 19/00* | (2006.01) | |
| *E01C 19/52* | (2006.01) | |
| *C04B 22/00* | (2006.01) | |
| *C04B 24/26* | (2006.01) | |
| *C04B 28/04* | (2006.01) | |
| *C04B 14/06* | (2006.01) | |

(52) U.S. Cl.
CPC ............. *E01C 19/52* (2013.01); *C04B 14/06* (2013.01); *C04B 22/0093* (2013.01); *C04B 24/2635* (2013.01); *C04B 28/04* (2013.01)

(58) Field of Classification Search
CPC ..... E01C 19/52; C04B 14/06; C04B 22/0093; C04B 24/2635; C04B 28/04
USPC .............................................. 404/17, 31, 47
See application file for complete search history.

(56) References Cited

U.S. PATENT DOCUMENTS

| | | | |
|---|---|---|---|
| 1,347,654 | A | 7/1920 | Parrish |
| 1,452,120 | A | 4/1923 | Lamb |
| 1,619,733 | A | 3/1927 | Jeppson |
| 3,683,578 | A | 8/1972 | Zimmerman |
| 4,421,797 | A | 12/1983 | Koehne |
| 4,430,463 | A | 2/1984 | Mullenax |
| 4,699,834 | A | 10/1987 | Schiffer |
| 4,963,055 | A | 10/1990 | Sims, Jr. |

(Continued)

FOREIGN PATENT DOCUMENTS

| | | |
|---|---|---|
| AU | 2005243604 A1 | 6/2006 |
| WO | 2013/086722 A1 | 6/2013 |

OTHER PUBLICATIONS

International Search Report and Written Opinion of the International Searching Authority for related International Patent Application No. PCT/US2016/060910 dated Jan. 25, 2017.

(Continued)

*Primary Examiner* — Raymond W Addie
(74) *Attorney, Agent, or Firm* — Troutman Sanders LLP; James E. Schutz; Micah B. Hensley

(57) ABSTRACT

One inch paver tiles may now be set over a concrete pad for use by vehicular traffic. The method and dry concrete mix may be used to overlay concrete driveways. The paver tiles may be laid over a dry concrete mix comprising a latex polymer, Portland cement, sand and a hydration control agent. After laying the paver tiles in a field over the concrete mix in the dry state, a border of paver tiles or other material may be laid in a wet concrete mix prior to hydrating the field paver tiles. The dry concrete mix cures after hydration to form a strong layer adhering the paver tiles to the concrete pad for use by vehicular traffic.

19 Claims, 1 Drawing Sheet

(56) References Cited

U.S. PATENT DOCUMENTS

| | | | |
|---|---|---|---|
| 5,069,721 | A | 12/1991 | Tamura et al. |
| 5,111,627 | A | 5/1992 | Brown |
| 5,839,251 | A | 11/1998 | Weinstein |
| 6,231,665 | B1 | 5/2001 | Kerkar et al. |
| 6,439,805 | B1 | 8/2002 | Ronin |
| 6,784,229 | B2 | 8/2004 | Rooshenas |
| 8,722,772 | B2 | 5/2014 | Moussios et al. |
| 9,169,382 | B2 * | 10/2015 | Kim-Habermehl . C04B 24/2641 |
| 9,624,131 | B1 * | 4/2017 | Dubey .................... C04B 28/14 |
| 2008/0066654 | A1 | 3/2008 | Fraser |
| 2009/0162602 | A1 | 6/2009 | Cottier et al. |
| 2013/0284069 | A1 * | 10/2013 | Dubey ...................... C04B 7/32 106/695 |
| 2015/0051312 | A1 * | 2/2015 | Chen ....................... C04B 24/24 523/201 |

OTHER PUBLICATIONS

Thinset Mortar Selection [Online]. FloorsTransformed.com [retrieved on Dec. 16, 2009]. Retrieved from the Internet: <URL: www.floorstransformed.com/choosethinset.html>.

Thin-Set Multi-Purpose No. 1550. Datasheet [online]. Quikrete. Retrieved from the Internet: <URL: www.quikrete.com>.

Laticrete 254 Platinum. Datasheet [online]. Laticrete. Retrieved from the Internet: <URL: www.laticrete.com>.

Underlay-SLU Self Leveling Underlayment [online]. Merkrete [retrieved on Dec. 16, 2009]. Retrieved from the Internet: <URL: www.merkrete.com/merkrete/underlay-SLU.htm>.

Re: Pavers over concrete patio?In DIY Chatroom (DIY Home Improvement Forum) [Online]. [retrieved on Dec. 15, 2009]. Retrieved from the Internet: <URL: www.diychatroom.com/f16/pavers-over-concrete-patio-2690/>.

Laying Flags: Bedding Materials [online]. ThePavingExpert.com [retrieved on Dec. 11, 2009]. Retrieved from the Internet: <URL: www.pavingexpert.com/layflag3.htm>.

Polymer Concrete and Mortar [online]. GlobalSpec.com [retrieved on Dec. 16, 2009]. Retrieved from the Internet: <URL: www.globalspec.com/learnmore/materials_chemicals_adhesives/industrial_adhesives/polymer_concrete_mortars_cement_products>.

Quikrete Multi-Purpose Thin Set Cement, 50 Lbs White [online]. Aubuchon Hardware [retrieved Dec. 10, 2009]. Retrieved from the Internet: <URL: www.paint-and-supplies.hardwarestore.com>.

Technical Services: Mortar, Thinset, Dryset, Polymer-Modified Mortar [online]. The Council of North America, Inc. [retrieved on Dec. 16, 2009]. Retrieved from the Internet: <URL: www.tileusa.com/thinset-mortar_faq.htm>.

History of Latex in Portland Cement Mortars TDS 107 [online]. Laticrete. Retrieved from the Internet: <URL: www.laticrete.com>.

RG+Polymeric Jointing Sand for Pavers. Datasheet [online]. Techniseal. Retrieved from the Internet: <URL: www.techniseal.com>.

* cited by examiner

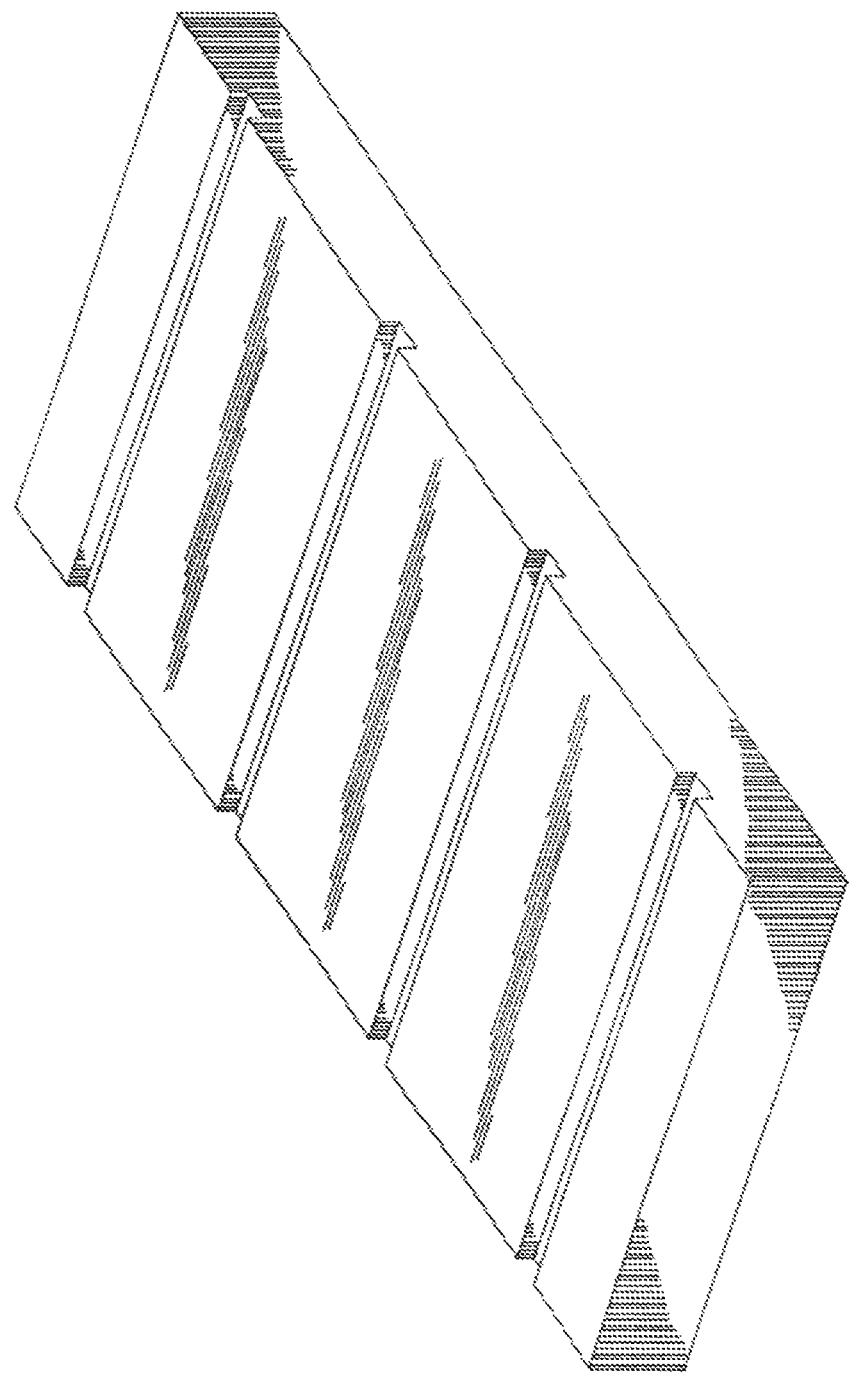

PAVER ADHESIVE AND METHOD OF LAYING PAVERS

CROSS-REFERENCE TO RELATED APPLICATIONS

This application is a continuation and claims the benefit, under 35 U.S.C. § 120, of U.S. patent application Ser. No. 15/288,433, filed 7 Oct. 2016, now U.S. Pat No. 9,790,650 entitled "PAVER ADHESIVE AND METHOD OF LAYING PAVERS," the entire contents and substance of which is incorporated herein by reference in its entirety as if fully set forth below.

FIELD OF THE INVENTION

A method is disclosed for laying paver tiles over a sad concrete pad without subsequent cracking of the paver tiles under vehicular traffic. Paver tiles installed over a solid concrete pad according to the method with a layer of the concrete mix between the paver tiles and the concrete pad can withstand vehicular traffic without significant cracking, releasing or otherwise degrading. The method comprises spreading the concrete mix in the dry state, laying the pavers down on top of the concrete mix in the dry state, then hydrating the concrete mix by spraying water on the paver concrete field to create the bond between the paver tiles and the concrete pad.

BACKGROUND

A concrete or cement (hereinafter "concrete") driveway, parking area, or parking lot will typically last a 20 to 30 years with minimal maintenance. However, certain conditions may shorten the lifespan of the concrete driveway and result in unsightly cracking, discoloration, settlement or scaling. The typical causes of concrete driveway distress include an improperly compacted subgrade, the use of an inadequate concrete mix, exposure to severe weather conditions, or bad placement procedures.

Many homeowners may wish to replace their old concrete driveway with a brick or paver brick driveway. Conventionally, this process comprises breaking and digging up the existing concrete driveway and its base. The old concrete and base material must then be trucked off and disposed of.

The base material, typically a limestone gravel, is then replaced and compacted. The base material must then be covered with a layer of sand. The sand layer is then compacted and leveled as a layer to support the paver bricks. The paver bricks are then laid on top of the leveled sand layer. The edges must be supported to prevent movement of the paver bricks. The edges may be supported by a concrete edge, paver bricks set in concrete, or a metal or plastic fixed edge. More detailed description of the process is described by the Interlocking Concrete Pavement Institute at https://www.icpi.org/paving-systems/concrete-pavers/installation. The paver bricks are thicker and more expensive than paver tiles. This process to convert a concrete driveway to a paver brick driveway is expensive, disruptive to existing landscaping, and time consuming There is no conventional method of reliably installing three quarter inch to one and half inch concrete pavers (hereinafter "paver tiles") over a concrete driveway for use by vehicular traffic. Conventional wisdom states that paver tiles are not made for vehicular applications in any situation and that paver tiles aren't even designed to set in cement or mortar over existing concrete applications.

The International Concrete Paver Institute (hereinafter "ICPI") that governs, qualifies, and mandates all specifications for use of paver tiles. The ICPI does not acknowledge driveway overlays with paver tiles and ICPI certified installers should not install paver tiles over concrete pads.

Paver tiles were developed for pedestrian use only, not vehicular. These paver tiles are an approved product to remodel pool decks, backyard patios, walkways and courtyards. But according to conventional wisdom in the art, paver tiles should never be considered for an overlay in a driveway or vehicular application. Using existing methods, eventually the paver tiles would crack and break apart from the weight of the vehicle and ail of the misting and turning of the tires. Using current methods, paver tiles carry no guarantee when used on concrete for vehicular use.

There exists a need for a method of laying paver tiles over a concrete pad such that the concrete tiles won't crack or crumble under vehicular use. There is also a need for a concrete mix for securely adhering the paver tiles to the concrete pad.

SUMMARY

A method for installing paver tiles over a concrete pad for use with vehicular traffic has been developed, An embodiment of the method comprises laying paver tiles over a solid concrete pad by spreading a dry concrete mix over the solid concrete pad in an area to be covered with a plurality of paver tiles, An embodiment of the dry concrete mix may comprise cement, silica sand, alumina silicate, and a dry latex polymer powder, such as, poly(ethylene -vinyl acetate). The dry concrete mix is spread out over the concrete pad without mixing with water prior to spreading, This is different than conventional tile setting with mortar or a wet cement. Therefore, the dry concrete mix does not include any liquid water as it is spread over the concrete or asphalt pad "concrete pad").

The method for installing paver tiles over a concrete pad further comprises laying the plurality of paver tiles on the dry concrete mix. The payer tiles are laid directly on top of the dry concrete mix prior to adding water to the concrete mix in any desired pattern: However, to create a solid edge to the paver field, paver tiles are fixed along a border of the concrete pad, in one embodiment of the method, fixing the border of the paver field comprises cutting a key groove adjacent to an outside edge of the solid concrete pad, spreading a wet cement or mortar over and into the key groove to provide a raised border on the concrete pad and setting paver tiles into the wet cement or mortar. The method further comprises applying water over the paver tiles after they are laid on the dry concrete mix, The water should be applied sufficiently to wet the dry cement mix between the paver tiles and the concrete pad. The wetted dry cement mix will typically require at least 24 hours to cure and fixedly attach the paver tiles to the concrete pad.

An embodiment of the dry concrete mix comprises portland cement, silica sand, alumina silicate, and polyethylene-vinyl acetate), The combination of components provides ease of use and sufficient adherence between the concrete pad and the paver tiles to prevent cracking of the tiles under vehicular use, The dry cement mix may be more conveniently spread than a wet mortar.

In a more specific embodiment, the dry concrete mix comprises portland cement in a concentration range from 30 wt. % to 50 wt. %, silica sand, perlite (alumina silicate) in a concentration range from 1 wt. % to 6 wt. %, and a dry, redispersible latex polymer powder, such as poly(ethylene-vinyl acetate) in a concentration range from 1 wt. % to 30 wt. %. In one embodiment, the dry concrete mix consists essentially of portland cement in a concentration range from 30 wt. % to 60 wt. %, silica sand in a concentration range from 25 wt. % to 60 wt. %, perlite (alumina silicate) in a concentration range from 1 wt. % to 6 wt. %, and poly (ethylene -vinyl acetate) or a dry, redispersible latex polymer powders in a concentration range from 1 wt. % to 30 wt. %.

In a more specific embodiment, the dry concrete mix comprises portland cement in a concentration range from 40 wt. % to 60 wt. %, silica sand, perlite (alumina silicate) in a concentration range from 0.3 wt. % to 3 wt. %, and a dry, redispersible latex polymer powder, such as poly(ethylene-vinyl acetate), in a concentration range from 0.5 wt. % to 3 wt. %. For certain applications, the dry concrete mix consists essentially of portland cement in a concentration range from 40 wt. % to 60 wt. %, silica sand in a concentration range from 40 wt. % to 60 wt. %, perlite (alumina silicate) in a concentration range from 0-5 wt. % to 3 wt. %, and dry, redispersible latex polymer powders such as poly(ethylene-vinyl acetate) in a concentration range from 0.5 wt. % to 1.0 wt. %. Such embodiments have been tested for in driveway installations for several years.

In a further embodiment, for example for use in colder climates, the dry concrete mix comprises portland cement in a concentration range from 30 wt. % to 60 wt. %, silica sand, perlite (alumina silicate) in a concentration range from 0.5 wt. % to 3 wt. %, and dry, latex polymer powders such as, but not limited to, poly(ethylene-vinyl acetate) in a concentration range from 5 wt. % to 30 wt. %. In a still further embodiment, for example for use in colder climates, the dry concrete mix comprises portland cement in a concentration range from 30 wt. % to 60 wt. %, silica sand, perlite (alumina silicate) in a concentration range from 0.5 wt. % to 3 wt. %, and dry, latex polymer powders such as, but not limited to, polyethylene-vinyl acetate) in a concentration range from 20 wt. % to 30 wt. %. For certain applications, the dry concrete mix consists essentially of portland cement in a concentration range from 40 wt. % to 60 wt. %) silica sand in a concentration range from 25 wt. % to 50 wt. %, perlite (alumina silicate) in a concentration range from 4 wt. % to 6 wt. %, and poly(ethylene-vinyl acetate) in a concentration range from 10 wt. % to 19 wt. %, In still another embodiment, the dry concrete mix consists essentially of portland cement in a concentration range from 35 wt. % to 45 wt. %, silica sand in a concentration range from 30 wt. % to 40 wt. %, perlite (alumina silicate) in a concentration range from 4 wt. % to 6 wt. %, and poly(ethylene-vinyl acetate) in a concentration range from 15 wt. % to 25 wt. %.

The terminology used herein is for the purpose of describing particular embodiments only, and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein. In describing the invention, it will be understood that a number of components, parts, techniques and steps are disclosed. Each of these has individual benefit and each can also be used in conjunction with one or more, or in some cases, all of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

BRIEF DESCRIPTION OF THE FIGURE

FIG. 1 shows a paver tile used in an embodiment of the method, wherein the paver tile comprises a bottom surface defining grooves.

DESCRIPTION

Prior to the invention described herein, there was no acceptable method of installing paver tiles over a concrete pad for use by vehicular traffic. Previous methods including providing a layer of sand between the concrete pad and the paver tiles or laying the paver tiles in a wet mortar were deemed unacceptable by the ICPI. Inevitably, paver tiles installed by these methods would experience significant breakage when experiencing vehicular traffic such as cars and personal trucks or commercial trucks such as, but not limited to, garbage trucks, delivery vans, moving trucks or dump truck, for example.

An embodiment of the method includes the following steps:

Step 1: Optionally, clean the concrete pad, such as by power washing the surface of the concrete pad to be covered with the paver tiles to remove dirt from the area to be covered, leaving a clean surface. It is preferable to wait for surface to substantially dry before moving to the next step.

Step 2: Spread a layer of dry concrete mix over a concrete pad, the layer may be between approximately ¼" to ½" in thickness (depth). (The dry concrete mix should be spread out evenly over the concrete to reduce any voids between the paver tiles and concrete pad.)

For uneven surfaces or dips in the surface of the concrete pad, consider increasing the recommended thickness (depth) in these areas to provide a level surface Any significant area should be a maximum of 1½" in thickness (depth) in order to float or level out the surface.

Cover any existing expansion joints or cracks. Small cracks, up to ¾" may be covered with dry concrete mix. If the concrete pad is damaged to a greater extent than that, the damaged concrete may be cut out to full depth and repaired. The cut out section should be refilled with concrete using rebar to provide the desired strength in the repair of full-depth repairs.

Step 3: Lay the paver'tiles over the dry concrete mix in the dry state. If appropriate, lay paver tiles square to abut any structure bordering the concrete pad (house, building, retaining wall, for example), or create a right angle (or an appropriate angle necessary for the desired orientation of the pattern) to start laying the field of paver tiles according to selected pattern. A border having a width equal to the width of one or less than one full paver from each edge making morn for the border course of paver tiles.

Step 4: After the field paver tiles have been placed, cut paver tiles to fit in the border to set as a border around the field tiles.

Step 5: Optionally, cut a groove in the existing concrete pad at border to enhance border paver bond strength. In some embodiments, this step may comprise cutting two substantially parallel grooves at the border of the concrete pad.

Step 6: Mix latex modifier with the dry concrete mix to create a mortar bed on which to lay the border paver tiles. Spread, the wet mortar in the border area to create a raised border around the dry concrete mix under the field tiles. Set the border paver tiles in the wet mortar to form a border. Border paver tiles should not overhang/protrude past the edge of existing concrete pad, if possible.

Step 7: Soak the entire newly installed paver tiles with water.

Step 8: After the border paver tiles have been set, spread mason sand over the paver tiles in the field and sweep in filling joints.

Step 9: After Installation is complete allow 24 to 72 hours for the concrete mix to cure and gain strength before allowing foot or vehicle traffic on the installation.

Embodiments of the dry concrete mix are a dry (packaged), no-mix, polymer-modified, portland cement-based mortar bed, designed to be placed in a dry state and hydrated m situ after laying paver tiles over the dry concrete mix prior to hydration. Currently, conventional approaches to laying paver tiles require shear mixing of the mortar with water before placement. The shear mixing adds air to control the curing period thought to be necessary for a strength and developing a strong bond. Currently, the certifying bodies in this area have not approved any method of laying paver tiles over concrete. The The method comprising the dry concrete functions to securely adhere the 1 inch paver tiles to the concrete pad to prevent breakage, in part, due to the "superstrata" coarse of paver tiles serves as curing membrane to prevent rapid evaporation of the water in the mix. Further, the unique "edge" construction, made by laying down a wet mortar bed and a coarse of border payers serves to "contain" the hydration water later applied to the primary field of pavers preventing hydraulic pressure from "washing out" the dry mix the pavers are seated upon.

An embodiment of the dry concrete aux comprises portland cement, silica sand, alumina silicate, and a dry, redispersible latex polymer powders. The dry, redispersible latex polymer powders may include, but are not limited to, poly(ethylene-vinyl acetate), poly(vinyl acetate-ethylene) (VAE, VAc/E), poly(vinyl acetate/vinyl ester of versatic acid) (VAE/VeoVa, VAM/VeoVa), poly(styrene acrylate), poly(ethylene-vinyl acetate), acrylic homopolymer, acrylic copolymers, acrylic terpolymers, poly(acrylic esters), polyvinylidene chloride (PVAC), poly(styrene-butadiene), poly(styrene-butadiene) copolymers, and poly (styrene-butadiene) terpolymers, for example. Various types (chemical families) and grades of dry, redispersible latex polymer powders may conceivably be used in the dry cement mix formulation without departing from the spirit of embodiments of the method and composition. The combination of components in the dry cement mix provides ease of use and sufficient adherence between the concrete pad and the paver tiles to prevent cracking of the tiles under vehicular use. The dry cement mix may be more conveniently spread than a wet mortar.

An embodiment of the dry concrete mix comprises portland cement, silica sand, alumina silicate, and poly(ethylene-vinyl acetate). In one embodiment, the dry concrete mix comprises portland cement in a concentration range from 30 wt. % to 60 wt. %, silica sand, perlite (alumina silicate) in a concentration range from 1 wt. % to 6 wt. %, and poly(ethylene -vinyl acetate) in a concentration range from 1 wt. % to 30 wt. %, In one embodiment, the dry concrete mix consists essentially of portland cement in a concentration range from 30 wt. % to 60 wt. %, silica sand in a concentration range from 25 wt. % to 60 wt. %, perlite (alumina silicate) in a concentration range from 1 wt. % to 6 wt. % and poly(ethylene-vinyl acetate) in a concentration range from 1 wt. % to 30 wt. %.

In a more specific embodiment, the dry concrete mix comprises portland cement in a concentration range from 40 wt. % to 60 wt. % silica sand, perlite (alumina silicate) in a concentration range from 0.5 wt. % to 3 wt. %, and poly(ethylene-vinyl acetate) in a concentration range from 0.5 wt. % to 5 wt. %.For certain applications, the dry concrete mix consists essentially of portland cement in a concentration range from 40 wt. % to 60 wt. %, silica sand in a concentration range from 40 wt. % to 60 wt. %, perlite (alumina silicate) in a concentration range from 0.5 wt. % to 3 wt. %, and poly(ethylene-vinyl acetate) in a concentration range from 0.5 wt. % 1.0 wt. %.

In a further embodiment, for example for use in colder climates, the dry concrete mix comprises portland cement in a concentration range from 30 wt. % to 60 wt. %, silica sand, perlite (alumina silicate) in a concentration range from 0.5 wt. % to 3 wt. %, and poly(ethylene-vinyl acetate) in a concentration range from 15 wt. % to 30 wt. %. For certain applications, the dry concrete mix consists essentially of poo land cement in a concentration range from 40 wt. % to 60 wt. %, silica sand in a concentration range from 25 wt. % to 50 wt. %, perlite (alumina silicate) in a concentration range from 4 wt. % to 6 wt. %, and poly(ethylene -vinyl acetate) in a concentration range from 15 wt. % to 30 wt. %. In still another embodiment, the dry concrete mix consists essentially of portland cement in a concentration range from 35 wt. % to 45 wt. %, silica sand in a concentration range from 30 wt. % to 40 wt. %, perlite (alumina silicate) in a concentration range from 4 wt. % to 6 wt. %, and poly(ethylene-vinyl acetate) in a concentration range from 15 wt. % to 25 wt. %.The formulation was designed to properly cure (hydrate over time), and adhere to the substrate Pearlite, or a substitute product for water retention, promotes water-retention in the mortar which aids in curing. The dry, redispersible latex polymer powders also promote water-retention (curing/hydration) and adhesion between the paver tiles and the concrete pad.

In some embodiments, the method comprises laying a paver tile with a grooved surface, such as, the paver tile show in FIG. 1. The grooves allow channeling of the water during the hydration process. Since the paver tiles are laid over a dry concrete mix, the dry concrete mix must be hydrated under paver tiles. The grooves allow channeling of the water under the paver the to provide a more complete hydration, then the paver tile acts as a membrane over the hydrated concrete to allow a slow, even curing to sufficient strength.

The ICPI requires at least three-year tests to certify methods of installing paver tiles. The longer the installations are exposed to the multiple temperatures and weather without significant degradation, the easier to get a method approved by the ICPI. The multiyear tests are required to ensure the methods are sufficient to provide a driveway that can stand up to vehicular traffic during all weather conditions without substantial breakage or lifting of the payer tiles or other degradation of the surface.

The inventors have conducted many experiments and paver the installations to test the various compositions and methods. After experimentation without addition of dry polymers, a dry, redispersible latex polymer powder was added to the dry concrete mix of Portland cement and sand. The polymer was added in concentrations from 0.5% to 1% and the adherence and performance improved. However, the cure time was reasoned to be too fast. A component to regulate water evaporation and incorporation was added.

After more than 250 test installations exposed the weather for multiple seasons, the dry concrete mix was refined to consists essentially of portland cement in a concentration range from 40 wt. % to 60 wt. %, silica sand in a concentration range from 25 wt. % to 50 wt. %, perlite (alumina silicate) in a concentration range from 4 wt. % to 6 wt. %, and poly(ethylene -vinyl acetate) in a concentration range from 15 wt. % to 30 wt. %.

The embodiments of the described method and dry concrete mix are not limited to the particular embodiments, components, method steps, and materials disclosed herein as such components, process steps, and materials may vary. Moreover, the terminology employed herein is used for the purpose of describing exemplary embodiments only, and the terminology is not intended to be limiting since the scope of the various embodiments of the present invention will be limited only by the appended claims and equivalents thereof.

Therefore, while embodiments of the invention are described with reference to exemplary embodiments, those skilled in the art will understand that variations and modifications can be effected within the scope of the invention as defined in the appended claims. Accordingly, the scope of the various embodiments of the present invention should not be limited to the above discussed embodiments, and should only be defined by the following claims and all equivalents.

What is claimed is:

1. A dry concrete mix for dry setting paver tiles, the dry concrete mix comprising:
   portland cement in a concentration range from approximately 30 wt. % to approximately 60 wt. %;
   silica sand in a concentration range from approximately 1 wt. % to approximately 6 wt. %;
   alumina silicate; and
   a dry, redispersible latex polymer powder in a concentration range from approximately 1 wt. % to approximately 30 wt. % wherein the dry, redispersible latex polymer powder comprises at least one of:
   poly(vinyl-acetate-ethylene);
   poly(styrene acrylate)
   poly(ethylene-vinyl acetate);
   acrylic homopolymers
   acrylic copolymers;
   acrylic terpolymers
   poly(acrylic esters);
   polyvinylidene chloride;
   poly(styrene-butadiene);
   poly(styrene-butadiene) copolymers; and
   poly(styrene-butadiene) terpolymers.

2. The dry concrete mix of claim 1, wherein the silica sand is in a concentration range from approximately 25 wt. % to approximately 60 wt. %.

3. The dry concrete mix of claim 1, wherein the portland cement is in a concentration range from approximately 40 wt. % to approximately 60 wt. %; the alumina silicate is in a concentration range from approximately 0.5 wt. % to approximately 3 wt. %; and the dry, redispersible latex polymer powder is in a concentration range from approximately 0.5 wt. % to approximately 5 wt. %.

4. The dry concrete mix of claim 1, wherein the portland cement is in a concentration range from approximately 40 wt. % to approximately 60 wt. %; the silica sand is in a concentration range from approximately 40 wt. % to approximately 60 wt. %; the alumina silicate is in a concentration range from approximately 0.5 wt. % to approximately 3 wt. %; and the dry, redispersible latex polymer powder is in a concentration range from approximately 0.5 wt. % to approximately 1 wt. %.

5. The dry concrete mix of claim 1, wherein the portland cement is in a concentration range from approximately 30 wt. % to approximately 60 wt. %; the alumina silicate is in a concentration range from approximately 0.5 wt. % to approximately 3 wt. %; and the dry, redispersible latex polymer powder is in a concentration range from approximately 5 wt. % to approximately 30 wt. %.

6. The dry concrete mix of claim 1, wherein the portland cement is in a concentration range from approximately 40 wt. % to approximately 60 wt. %; the silica sand is in a concentration range from approximately 25 wt. % to approximately 50 wt. %.; the alumina silicate is in a concentration range from approximately 4 wt. % to approximately 6 wt. %; and the dry, redispersible latex polymer powder is in a concentration range from approximately 10 wt. % to approximately 19 wt. %.

7. The dry concrete mix of claim 1, wherein the portland cement is in a concentration range from approximately 35 wt. % to approximately 45 wt. %; the silica sand is in a concentration range from approximately 30 wt. % to approximately 40 wt. %.; the alumina silicate is in a concentration range from approximately 4 wt. % to approximately 6 wt. %; and the dry, redispersible latex polymer powder is in a concentration range from approximately 15 wt. % to approximately 25 wt. %.

8. The dry concrete mix of claim 1, wherein the portland cement is in a concentration range from approximately 40 wt. % to approximately 60 wt. %; the silica sand is in a concentration range from approximately 25 wt. % to approximately 50 wt. %.; the alumina silicate is in a concentration range from approximately 4 wt. % to approximately 6 wt. %; and the dry, redispersible latex polymer powder is in a concentration range from approximately 19 wt. % to approximately 30 wt. %.

9. The dry concrete mix of claim 1, wherein the portland cement comprises:
   Type I cement in a concentration range from approximately 40 wt. % to approximately 60 wt. %; and
   Type II cement in a concentration range from approximately 40 wt. % to approximately 60 wt. %.

10. A dry concrete mix for dry setting paver tiles, the dry concrete mix comprising:
    portland cement in a concentration range of approximately 30 wt. % to approximately 60 wt. %;
    silica sand in a concentration range of approximately 1 wt. % to approximately 6 wt. %;
    alumina silicate; and
    a dry, redispersible latex polymer powder in a concentration range from approximately 1 wt. % to approximately 30 wt. %, wherein the dry, redispersible latex polymer powder comprises poly(vinyl acetate/vinyl ester of versatic acid).

11. A method of laying a plurality of paver tiles comprising:

spreading the dry concrete mix of claim 1 on a solid surface, the dry mix including:
portland cement;
silica sand;
alumina silicate; and
a dry, redispersible latex polymer powder;
laying a plurality of paver tiles on at least a portion of the dry concrete mix on the solid surface; and
spraying water over the plurality of paver tiles.

12. The method of claim 11 further comprising creating a raised lip defining a border of an area in which the plurality of paver tiles will be laid.

13. The method of claim 11 further comprising, prior to spreading the dry concrete mix on the solid surface, pressure cleaning with water the solid surface.

14. The method of claim 13 further comprising, prior to spreading the dry concrete mix on the solid surface, drying, or allowing to dry, the solid surface.

15. The method of claim 11, wherein spreading the dry concrete mix on the solid surface comprises spreading the dry concrete mix to a generally uniform depth.

16. The method of claim 15, wherein the generally uniform depth is in the range of approximately one-eighth inch to approximately three-eighths inch.

17. The method of claim 15, wherein the generally uniform depth is in the range of approximately one-quarter inch to approximately one-half inch.

18. The method of claim 11, wherein laying the plurality of paver tiles results in the formation of a joint between adjacent paver tiles of the plurality of paver tiles; and
the method further comprises distributing mason sand to the joint.

19. The method of claim 11, wherein each paver tile in the plurality of paver tiles has a thickness in the range of approximately one inch to approximately one and one-half inches.

* * * * *